No. 686,863. Patented Nov. 19, 1901.
J. D. McFARLAND, Jr.
AUTOMATIC OILING DEVICE.
(Application filed Mar. 13, 1901.)

(No Model.)

Witnesses,

Inventor,
James D. McFarland Jr.
Dewey Strong & Co.
Attys

UNITED STATES PATENT OFFICE.

JAMES D. McFARLAND, JR., OF SAN FRANCISCO, CALIFORNIA, ASSIGNOR OF ONE-HALF TO JOHN BRUCKMAN, OF SAN FRANCISCO, CALIFORNIA.

AUTOMATIC OILING DEVICE.

SPECIFICATION forming part of Letters Patent No. 686,863, dated November 19, 1901.

Application filed March 13, 1901. Serial No. 50,949. (No model.)

*To all whom it may concern:*

Be it known that I, JAMES D. MCFARLAND, Jr., a citizen of the United States, residing in the city and county of San Francisco, State of California, have invented an Improvement in Automatic Oiling Devices; and I hereby declare the following to be a full, clear, and exact description of the same.

My invention relates to improvements in oiling devices for piston-cylinders and other moving parts where oil must be fed with unceasing regularity.

It consists, essentially, of an oil-containing vessel, a double-headed piston-valve adapted to reciprocate in an opening in said vessel, and an oil-passage in this valve through which the oil may pass intermittently from the vessel to the part to be lubricated.

It also consists of means by which the amount of oil delivered may be limited and of details more fully to be hereinafter set forth.

Figure 1:
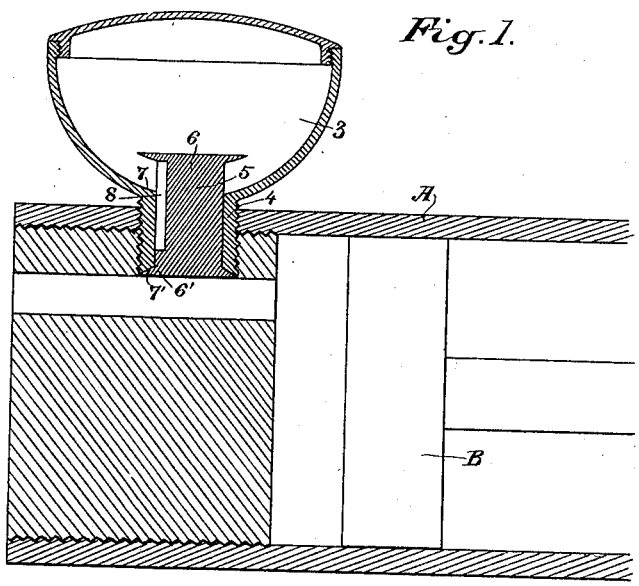
Figure 2:
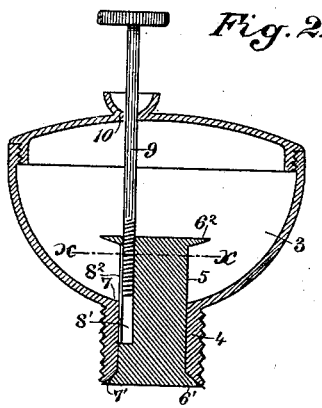
Figure 4:
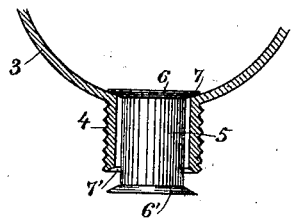
Figure 3:
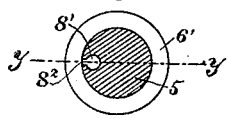

Having reference to the drawings, Figure 1 is a vertical section through the oiling device and connections. Fig. 2 is a modification thereof on line $y\ y$ of Fig. 3. Fig. 3 is a horizontal section of the valve on line $x\ x$ of Fig. 2. Fig. 4 shows the valve without a channel.

In the drawings I show my invention in connection with a part of the cylinder of a gas-engine of the automobile type and wherein the cylinders are quite small and a screw-plug serves for the cylinder-head, said head having a passage through it through which the exhaust and suction take place. As shown therein, 3 is a cup, of suitable shape and size, having an extended bottom portion 4. Through this extension the piston-valve 5 is slidable. This valve is provided with heads 6 and 6', having suitable seats 7 and 7', respectively, in the portion 4. These heads are preferably cone form, as shown. A longitudinal channel 8 is made in the valve intermediate of the heads 6 and 6'. The length of this channel may be varied according to the size, uses, &c., of the valve. It is through this channel that the oil is fed from the cup to the parts to be lubricated. When the valve is pushed upwardly into the cup, the oil flows into this channel, the walls of which, with the casing inclosing the valve, form a tube, as it were, holding the amount of oil to be discharged from the cup. As the valve drops down the head 6 comes upon its seat and prevents any escape of oil from the cup; but the channel 8 being of sufficient length that its lower end projects beyond the end of the portion 4 the oil in the channeled tube is forthwith discharged. As applied here for the purpose of illustration this valve is attached to an engine-cylinder, as A, having a piston B. The reciprocation of the piston B in the cylinder alternately fills and exhausts the cylinder, causing a reciprocation of the valve 5. With each explosion and exhaustion of the cylinder the valve is forced upward by the pressure and the channel 8 allowed to fill. With each suction the valve drops down and discharges its oil. Furthermore, only so much oil as is contained in the channel is discharged.

As a means of regulating the amount of feed I have shown in Fig. 2 a modification wherein the channel 8' is circular in form and threaded and extending through the head $6^2$ of the valve. This channel is placed eccentrically of the valve, and a suitable longitudinal slot $8^2$ leaves the channel 8' practically open except where it passes through the head $6^2$ for the reception and discharge of oil as before. A regulating-stem 9 screws into the threaded channel 8' and the length of the oil-receiving portion of the channel varied accordingly. The stem passes upwardly through a guide 10 in the top of the cup, and by means of this guide and by reason of the eccentric position of the stem in relation to the valve the latter is prevented from turning.

While I have shown my device here in conjunction with a cylinder and piston and operated in the manner described, it is understood that other means may be employed to reciprocate the valve.

Though I have described this valve as channeled, such channel may be dispensed with entirely by simply making the valve 5 of a lesser diameter than the interior diameter of the extension 4, thus forming an annular oil-conducting space between the heads of the valve. As the valve is lifted the oil will flow around the valve and fill the space, and as the valve drops the head 6 will seat as before, closing the oil-cup, and the oil will be discharged.

Having thus described my invention, what I claim as new, and desire to secure by Letters Patent, is—

1. The combination in an automatic oiler of a cup, an opening in the bottom of the cup, a valve slidable therein, flanges on either end of said valve, seats upon the inner and outer ends of said opening to receive said flanges, an open channel in said valve intermediate of the flanges, and means whereby the length of the oil-channel may be varied.

2. The combination in an automatic oiler, of a cup, an opening in the bottom of the cup, a valve slidable therein, flanges on either end of said valve, seats for said flanges, a longitudinal channel in said valve through which the oil is intermittently discharged from the cup, and means whereby the length of this channel may be varied.

3. The combination in an automatic oiler, of a cup, an extension on the bottom of said cup, an opening in said extension, a valve slidable in this opening, one end of the valve adapted to seat within the cup and the other end provided with a seat exterior thereto, a channel in said valve, and a stem fitting within this channel whereby the length of the latter may be varied.

4. In an oil-cup adapted for application to a chamber in which vapor is alternately exhausted and filled, and having an opening into said chamber, the combination of a valve slidable in said opening, one end of the valve adapted to seat within the cup and the other provided with a seat exterior thereto, a channel in said valve eccentric to the axis of the valve, said channel terminating short of the lower end of the valve, and a stem fitting within said channel and extending upwardly through the cup, by means of which stem the length of the channel is varied, and by the alternate exhaustion and suction of the cylinder, the valve is made to reciprocate and alternately allow the channel to be filled with oil from the cup as the valve is lifted, and to discharge the oil contained in said channel when the valve is depressed.

In witness whereof I have hereunto set my hand.

JAMES D. McFARLAND, Jr.

Witnesses:
S. H. NOURSE,
JESSIE C. BRODIE.